(12) United States Patent
Yeap et al.

(10) Patent No.: US 6,940,973 B1
(45) Date of Patent: Sep. 6, 2005

(54) METHOD AND APPARATUS FOR CANCELLING COMMON MODE NOISE OCCURRING IN COMMUNICATIONS CHANNELS

(75) Inventors: Tet Hin Yeap, Ottawa (CA); David Kenneth Fenton, Ottawa (CA)

(73) Assignee: Bell Canada, Montreal (CA)

( * ) Notice: Subject to any disclaimer, the term of this patent is extended or adjusted under 35 U.S.C. 154(b) by 647 days.

(21) Appl. No.: 09/588,064

(22) Filed: Jun. 7, 2000

Related U.S. Application Data (60) Provisional application No. 60/137,718, filed on Jun. 7, 1999.

(51) Int. Cl.⁷ .............................................. H04M 3/18
(52) U.S. Cl. ........................ 379/416; 375/346; 375/285
(58) Field of Search .......................... 379/399.01, 416, 379/402; 375/346, 347, 349, 350

(56) References Cited

U.S. PATENT DOCUMENTS

| | | | | |
|---|---|---|---|---|
| 3,825,843 A | * | 7/1974 | Felsberg et al. | 327/317 |
| 4,287,475 A | * | 9/1981 | Eaton et al. | 327/552 |
| 5,832,032 A | * | 11/1998 | Overbury | 375/285 |
| 6,173,021 B1 | * | 1/2001 | Bingel et al. | 375/346 |

FOREIGN PATENT DOCUMENTS

WO    WO 99/63675    12/1999

OTHER PUBLICATIONS

Bernard Widrow et al. entitled "Adaptive Noise Cancellation: Principles and Applications", *Proceedings of the IEEE*, vol. 63, No. 12, Dec. 1975, pp. 1692-1716.

"Multirate Signal Processing", Chapter 7, *Advanced Digital Signal Processing: Theory and Applications*, by G. Zelniker and F. Taylor (Marcel Dekker, Inc.).

Ali N. Akansu et al., "Wavelet and Subband Transforms: Fundamentals and Communication Applications", *IEEE Communications Magazine*, Dec. 1997, pp. 104-115.

J. Cioffi et al., "Analog RF Cancelation with SDMT (96-084)", Standard T1E1.4/96-084.

Perfect-channel Splitting By Use of Interpolation and Decimation Tree Decomposition Techniques, Crosier et al., *Proc. Intl. Symp. on Circuit and Systems*, Petras, Greece, Aug. 1976, pp. 443-446.

* cited by examiner

*Primary Examiner*—Xu Mei
*Assistant Examiner*—Walter F. Briney, III
(74) *Attorney, Agent, or Firm*—Thomas Adams (57) ABSTRACT

In order to overcome problems when using an adaptive filter for cancellation of common-mode noise in digital subscriber loops, caused by a portion of the differential signal being converted to common mode, which degrades the performance of the filter, a noise cancellation technique is proposed which compensates for this cross-coupled signal energy. In particular, a digital noise detector is used to detect one or more noisy frequency bands of the common mode signal and pass only the digitized common mode signal in those detected frequency bands through the adaptive filter to produce a digital common mode noise estimate signal. A control unit adjusts coefficients of the adaptive filter to reduce correlation between the differential signal and common mode signal. It is also proposed to compensate for the effects of stray capacitive coupling across the usual hybrid device by including an equivalent capacitive component in a common mode noise estimation circuit.

14 Claims, 5 Drawing Sheets

METHOD AND APPARATUS FOR CANCELLING COMMON MODE NOISE OCCURRING IN COMMUNICATIONS CHANNELS

CROSS-REFERENCE TO RELATED APPLICATION

This invention claims priority from U.S. Provisional patent application No. 60/137,718 and Canadian patent application number 2,273,658, both filed Jun. 7, 1999, the contents of which are incorporated herein by reference.

This invention relates to noise cancellation and is especially applicable to a method and apparatus for cancelling common mode noise occurring in communications channels, particularly telephone subscriber loops employing twisted-wire pairs, connected to a receiver.

BACKGROUND ART

In theory, twisting together the conductors forming a twisted-wire cable, as used in a telephone subscriber loop, ensures that the impedance is balanced throughout its length. In practice, however, there are imbalances. For example, moisture ingress might cause one conductor to have greater leakage to ground, the twisting might not be uniform, and the conductors might be untwisted where taps are made. When a signal propagates along the cable, the waves on the respective conductors encounter different complex impedances. As a result, they may propagate at different speeds and be subject to different distortion. Upon arrival at the receiver, the two waves are no longer symmetrical. Although this effect can usually be ignored in conventional telephone systems, it presents problems in high speed digital subscriber loops, especially Very High speed Digital Subscriber Loops (VDSL) which operate at radio frequencies. Radio-frequency (RF) signals from commercial AM or amateur radio transmitters frequently couple to twisted wire cables, particularly to overhead service drops, as a common mode noise signal. Because of the above-described cable imbalance, some portion of such an RF interference signal will usually convert to differential mode and be coupled inductively across the hybrid device. In addition, the stray capacitance between the input and output of the hybrid will couple the RF interference signal to appear at the output of the hybrid device. This may be significant if the RF interference signal is relatively large in amplitude.

Various systems have been proposed to cancel common mode noise in subscriber loops. In T1E1.4/96-084 dated Apr. 18, 1996, and at a VDSL workshop at IEEE Globecom, Nov. 18, 1996 in London, England, John Cioffi and John Bingham proposed doing so by extracting a signal representing common mode noise and filtering it using an adaptive analog wide band filter to provide a radio frequency noise estimate for subtraction from the differential signal obtained from the secondary of the hybrid transformer. The coefficients of the adaptive filter were tuned during quiet periods, i.e. when no signal is being transmitted, to reduce the difference between the differential signal and the noise estimate signal substantially to zero. Unfortunately, in normal operation, the adaptive analog filter cannot readily compensate for the cross-coupling of the differential signal and common mode signals due to the loop imbalance and so, during signal transmission, will cancel part of the differential information signal too. Accordingly, the resulting signal supplied to the receiver will be distorted.

Canadian patent application No. 2,237,460 filed May 13, 1998, naming one of the present inventors, disclosed a noise suppression circuit in which a narrowband noise detection and control unit scanned the operating band to identify noisy frequency bands and suppressed the noise in those bands. The circuit is not entirely satisfactory because it requires the number of interfering RF signals to be few and does not cancel impulse noise. International patent application No, WO 99/63675 published Dec. 9, 1999, also naming such inventor, disclosed a wideband common mode noise canceller in which a digital common mode signal was filtered by an analysis filter bank to produce subband signals at different frequencies. Previous samples of each of the subband signals were summed and compared with a predetermined noise threshold. If the summed noise signal was greater than the threshold, the subband signal was processed by a synthesis filter to form a component of a noise estimate signal for subtraction from the differential signal. While this circuit will compensate to some extent for stray capacitance of the hybrid device and the above-described loop imbalance caused by inductive coupling close to the receiver, its performance is limited since RF interference often is coupled into the loop as positions far from the receiver.

DISCLOSURE OF INVENTION

An object of embodiments of the present invention is to mitigate or eliminate either or both of the above-described effects of impedance imbalance and capacitive coupling.

According to one aspect of the present invention, a noise cancellation circuit for a communications channel comprising a differential signal path and a common mode signal path connected to respective inputs of a summing device, the differential signal path comprising input means connected to the channel for receiving a differential signal therefrom and supplying the differential signal to a first of the inputs of the summing device, the common mode signal path comprising extraction means coupled to the channel for extracting therefrom a common mode signal, and coupling means for coupling at least part of the extracted common mode signal to a second of the inputs of the sunning device as a common mode noise signal, the coupling means comprising a circuit element having a fixed capacitance equivalent to stray capacitance coupling between an input and an output, respectively, of the input means, the circuit further comprising delay means for compensating for phase differences between the differential signal and common mode noise signal before their application to the summing device, the summing device providing as an output signal of the noise cancellation circuit the difference between the differential signal and the common mode noise signal.

According to a second aspect of the invention, a noise cancellation circuit for a communications channel comprises a differential signal path and a common mode signal path connected to respective inputs of a digital adder, the differential signal path comprising input means connected to the channel for receiving a differential signal therefrom and analog-to-digital converter means coupled to the input means for digitizing the received differential signal and applying the digitized differential signal to a first of the inputs of the digital adder, the common mode signal path comprising extraction means coupled to the channel for extracting therefrom a common mode signal, a second analog-to-digital converter means coupled to the extraction means for digitizing the extracted common mode signal and applying the digitized extracted common mode signal to a noise detector for detecting one or more noisy frequency bands of the common mode signal and passing the digitized common mode signal in those detected frequency bands to an adaptive filter, the adaptive filter filtering the digitized common mode signal to produce a digital common mode noise estimate signal and applying the digital estimate signal to the second input of the digital adder, control means having inputs connected to the differential signal path and the common mode signal path and for determining correlation between signals in the differential signal path and common mode signal path and adjusting coefficients of the adaptive filter in dependence thereupon so as to reduce correlation between the differential and common mode signals, the circuit further comprising means for compensating for phase differences between the differential signal and the common mode signal before their application to the digital adder, the adder providing as an output signal of the noise cancellation circuit the difference between the differential signal and the digital common mode noise estimate signal.

In embodiments of either of the first and second aspects of the invention, the first compensating means may comprise a delay unit interposed between the input means and the first summing device and having a delay period substantially equal to delay introduced in the first common mode signal path.

In embodiments of either of the first and second aspects of the invention, where the input means comprises a hybrid transformer, the capacitive coupling means comprises a second hybrid transformer similar to the first hybrid transformer, the primary winding of the second hybrid transformer being short-circuited and connected to the output of the common mode signal extraction means for reception of the common mode signal and the secondary winding of the second transformer being connected to said second input of the summing device.

Embodiments of the invention may combine both aspects of the invention. Thus, according to a third aspect of the invention, a noise cancellation circuit for a communications channel comprises a differential signal path and a first common mode signal path connected to respective inputs of a summing device, the differential signal path comprising input means connected to the channel for receiving a differential signal therefrom and supplying same to a first of the inputs of the summing device, the first common mode signal path comprising extraction means coupled to the channel for extracting therefrom a common mode signal and coupling means connected between the common mode extraction means and a second input of the summing means for coupling an analog common mode noise estimate signal to the summing means, the coupling means having a capacitive component equivalent to stray capacitance coupling between the input and the output, respectively, of the input means, and first compensating means for compensating for phase differences between the differential signal and analog common mode noise estimate signal before their application to the summing device, the output of the summing device being connected by way of an analog-to-digital converter to a first input of a digital adder means, the circuit further comprising a second common mode signal path connected between the common mode signal extraction means and a second input of the digital adder, the second common mode signal path comprising a noise detector connected by way of an analog-to-digital converter to the output of the common mode extraction means, the noise detector being operable to detect one or more noisy frequency bands of a digitized common mode signal from the analog-to-digital converter means and pass the digitized common mode signal in those detected frequency bands to an adaptive filter, the output of the adaptive filter comprising a digital common mode noise estimate signal and being applied to a second input of the digital adder means, the circuit comprising control means connected to the differential signal path and the digital common mode signal path for determining correlation between signals in the differential signal path and digital common mode signal path, respectively, and adjusting coefficients of the adaptive filter in dependence thereupon so as to reduce correlation between said signals, the circuit further comprising second compensating means for compensating for phase differences between the signal output from the first summing means and the digital common mode noise estimate signal before their application to the respective inputs of the digital adder means, the digital adder means providing as an output signal of the noise cancellation circuit the difference between the differential signal and the two common mode noise estimate signals.

In embodiments of either of the first and third aspects of the invention, the noise detector may comprise a bank of narrowband filters having a degree of overlap therebetween for splitting the common mode signal into a corresponding plurality of narrowband signals, selector means being controlled by the control unit to select the noisy bands, and combining means for combining signals in the selected bands to form the digital common mode noise estimate signal.

The selector means may then comprise a bank of selectors each for a corresponding one of the narrowband signals, the circuit then comprising a plurality of averaging means for deriving a running average of samples of the narrowband signals, comparing such average with a corresponding threshold, and controlling the corresponding selector in dependence upon such comparison, the control unit controlling the threshold levels to select the noisy bands.

The narrowband filters may comprise components of an analysis filter bank having a plurality of downsamplers each for downsampling a respective one of the narrowband signals and the combining means comprises a corresponding synthesis filter bank.

The noise detector may comprise a circuit as described and claimed in copending Canadian patent application No. 2,239,675.

According to fourth, fifth and sixth aspects of the invention, there are provided noise cancellation methods corresponding to the noise cancellation circuits of the first second and third aspects.

BRIEF DESCRIPTION OF THE DRAWINGS

Embodiments of the invention will now be described by way of example only and with reference to the accompanying drawings in which.

BEST MODES FOR CARRYING OUT THE INVENTION

In the drawings, identical or corresponding items in the different figures have the same reference numeral, in some cases with a suffix or prime to indicate a modification.

Figures 1, 2:
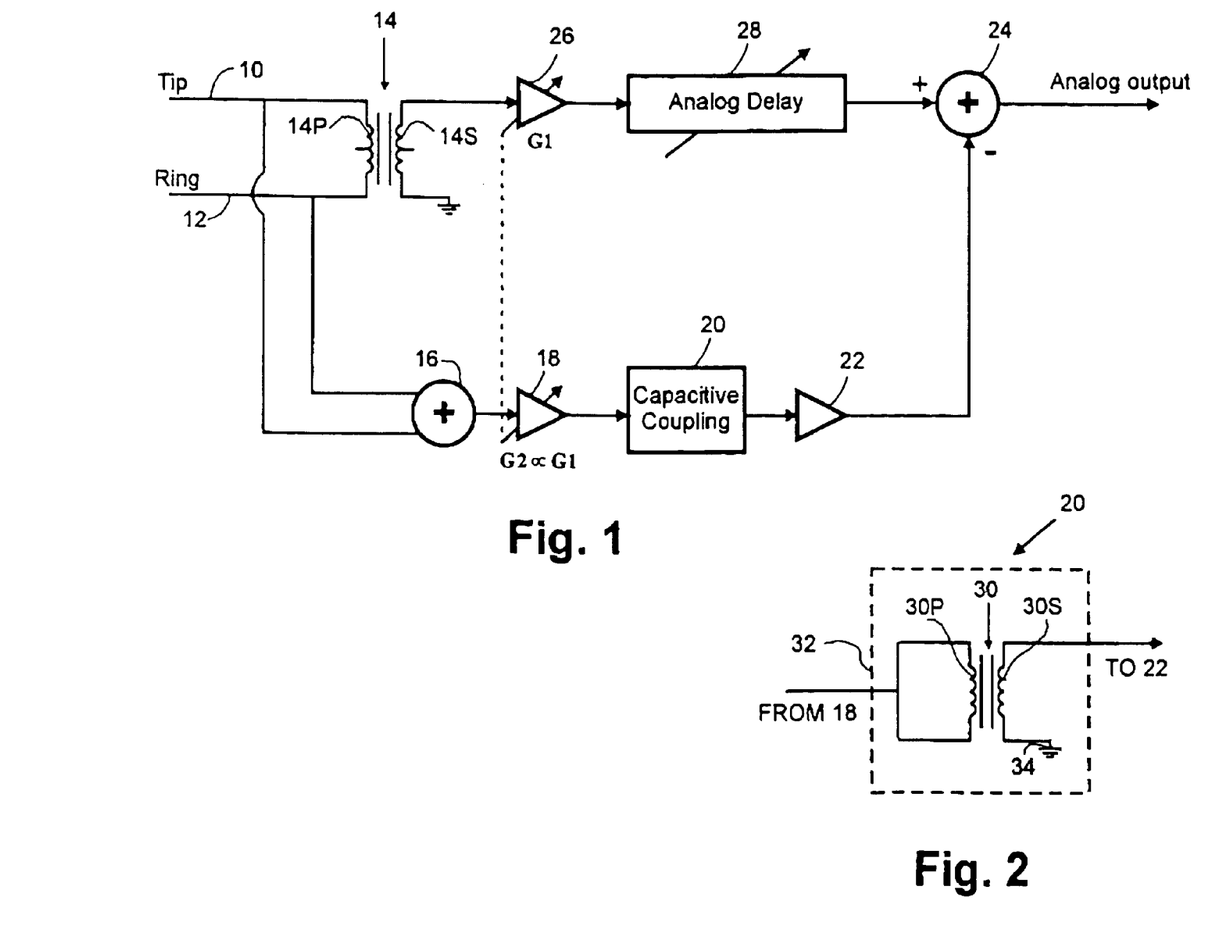
FIG. 1 illustrates a first embodiment of the invention in the form of a noise canceller with capacitive coupling.
FIG. 2 illustrates a capacitive coupling device of the embodiment of FIG. 1.

FIG. 1 illustrates, schematically, a noise suppression circuit according to a first embodiment of the invention connected to a communications channel. More specifically, the communications channel comprises a twisted-wire pair subscriber loop having the TIP and RING wires 10 and 12 connected to input means, specifically respective ends of the primary winding 14P of a hybrid transformer 14 and also to respective inputs of a summer 16 which extracts a common mode signal. The secondary winding 14S of the hybrid transformer 14 has one end grounded and the other end connected by way of a variable-gain amplifier 26 and an analog delay line 28 to one input of a summer 24, the output of which is coupled to the usual receiver (not shown). The hybrid transformer 14 converts the signal received from the subscriber loop 10 to a differential signal which includes a component corresponding to common mode noise in the received signal. The summer 24 subtracts from the differential signal a common mode noise estimate signal derived from the output of the summer 16, which is supplied by way of a second variable gain amplifier 18, a capacitive coupling device 20 and an inverting amplifier 22 to a second input of the summer 24. During manufacture, the delay provided by the analog delay unit 28 is adjusted to compensate for delay introduced in the common mode path, specifically by the amplifiers 18 and 22 and the capacitive coupling device 20, so that the common mode estimate signal is synchronized with the different signal at the summer 24. Likewise, the gains in the differential signal path and common mode signal path are adjusted by adjusting the respective gains of the amplifiers 18 and 26 so that the amplitude of the common mode noise estimate signal will correspond to that of the common mode noise component of the differential signal. The gain of the amplifier 18 is proportional to the gain of amplifier 26.

As illustrated in FIG. 2, the capacitive coupling device 20 conveniently comprises a second hybrid transformer 30 substantially identical to the hybrid transformer 14. The primary winding 30P of second transformer 30 is short-circuited and connected to the output of amplifier 18, while its secondary winding 30S has one end grounded and the other end connected to the amplifier 22. Because the primary winding 30P is short-circuited, the common mode signal will be coupled to the amplifier 22 by way of the stray capacitive coupling of the second transformer 30, which should be substantially the same as the stray capacitive coupling of the first transformer 14. Consequently, the noise estimate signal subtracted from the differential signal should correspond to that coupled across the stray capacitance of the first transformer 14.

Where the subscriber loop is well-balanced, and relatively short, say a few hundred meters long, the noise cancellation circuit of FIG. 1 might be sufficient. In many cases, however, the subscriber loop is not well-balanced and it is necessary to compensate for such imbalance. The noise cancellation circuit illustrated in FIG. 3 compensates for loop imbalance.

Figure 3:
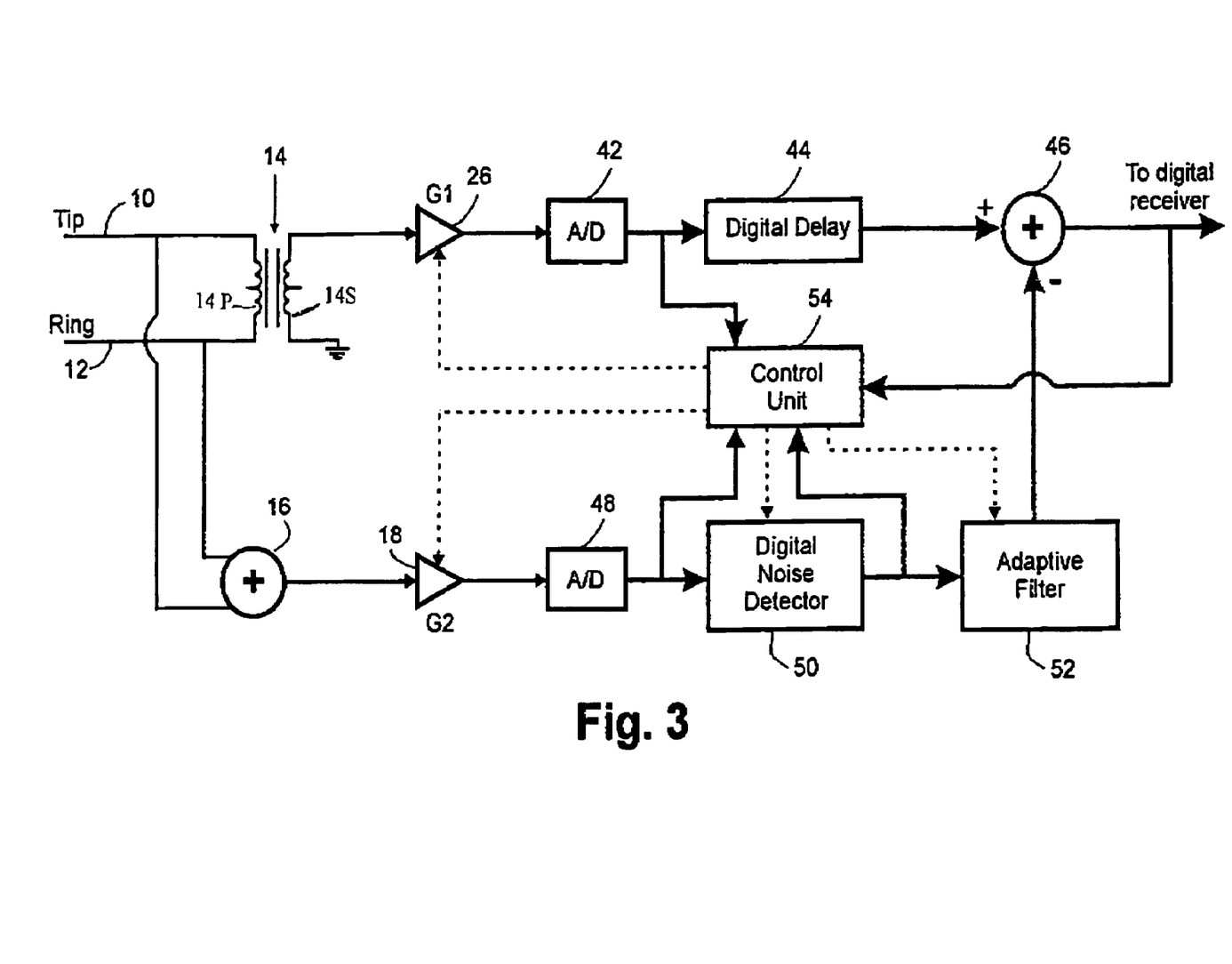
FIG. 3 illustrates a second embodiment of the invention in the form of a noise canceller having a noise detector and an adaptive filter.

FIG. 3 illustrates a noise cancellation circuit according to a second embodiment of the invention which compensates for loop imbalance. The noise cancellation circuit comprises a differential signal path comprising a hybrid transformer 14 having its primary winding 14P connected to the TIP 10 and RING 12 of a twisted-wire pair subscriber loop. One end of its secondary winding 14S is grounded and the other end is connected to an input of a variable gain amplifier 26. The output of amplifier 26 is connected by way of an analog-to-digital converter 42 and digital delay unit 44 to a first input of a digital adder 46. The adder 46 subtracts from the delayed differential signal a common mode noise estimate signal which is derived via a common mode signal path comprising the summer 16, a variable gain amplifier 18, a second analog-to-digital converter 48, a digital noise detector (DND) 50 and an adaptive filter 52. The digitized common mode signal is applied to the digital noise detector which detects the frequency bands in which there is significant noise and passes to the adaptive filter 52 only the signal in those bands. The adaptive filter 52 is controlled by a control unit 54, specifically a microcontroller, which has inputs connected to the differential path at the output of the A/D converter 42, to the common mode signal path at the output of the A/D converter 48, to the output of the digital noise detector 50 and to the output of the adder 46, which constitutes the output of the noise cancellation circuit. As illustrated by functional blocks 5.1 and 5.2 of FIG. 5, which illustrates pertinent functions of the control unit/microcontroller 54, the latter also controls the gains of amplifiers 26 and 18 to ensure that the signals applied to the A/D converters 42 and 48, respectively, are within their proper operating ranges.

The digital delay 44 is adjusted during manufacture to compensate for delay introduced by summing device 16, amplifier 18, A/D converter 48 and digital noise detector 50. Although the adaptive filter 52 is in the common mode signal path, it need not be taken into account because its normal operation entails compensating for delays.

It should be noted that the noise canceller of FIG. 3 does not need quiet periods but will adapt the coefficients of adaptive filter 52 during normal operation. Thus, in operation, the common mode signal is digitized and applied to the digital noise detector 50 which will detect significant noise signals; these noise signals are, of course, most likely to have been inductively coupled into the twisted-wire pair. Only the portion of the common mode signal in the noisy frequency bands will be passed to the adaptive filter 52 as the noise estimate signal. The control unit 54 monitors the cross-correlation between the output of the digital noise detector 50 and the output of the output adder 46 and tunes the coefficients of the adaptive filter 52 so as to reduce the correlation—substantially to zero. A significant advantage of this embodiment is that it does not require a quiet period to tune the adaptive filter.

A preferred adaptive filter 52 processes the common-mode noise signal from DND 50 such that it is as close as possible to the common mode noise component of the differential signal at the input to adder 46 by iteratively adjusting the coefficients (tap weights). The design of such an adaptive filter is known to persons skilled in this art and so is not further discussed here; a good description can be found in an article by Bernard Widrow et al. entitled "Adaptive Noise Cancellation. Principles and Applications", *Proceedings of the IEEE*, Vol. 63, No. 12, December 1975, pp. 1692–1716.

A suitable digital noise detector (DND) 50 is disclosed in copending Canadian patent application No. 2,239,675 and will now be described with reference to FIG. 4. In the digital noise detector 50, the digital common mode signal from A/D converter 48 (FIG. 3) is supplied to an analysis filter bank 60 which comprises a lowpass filter $61_1$, a plurality of bandpass filters $61_2$ to $61_{M-1}$ each having a different centre frequency, and a highpass filter $61_M$. The narrowband signals from the filters $61_1$ to $61_M$ are supplied to respective ones of a corresponding plurality of downsamplers $62_1$ to $62_M$, each of which downsamples by a factor M. In this preferred embodiment, the downsampling rate M is equal to the number of subbands, i.e., the analysis filter bank 60 is uniformly, maximally decimated.

The plurality of subband signals $S_1$ to $S_M$ are applied to a corresponding plurality of noise detection circuits $63_1$ to $63_M$, respectively, the outputs of which comprise respective subband noise estimate signals $E_1$ to $E_M$. The subband noise estimate signals $E_1$ to $E_M$ are supplied to respective inputs of a synthesis filter bank 64. The analysis filter bank 60 and the synthesis filter bank 64 are complementary and designed to provide "pseudo perfect reconstruction" as described earlier. Thus, synthesis filter bank 64 comprises a plurality of upsamplers $65_1$ to $65_M$ which receive and upsample the digital subband noise estimate signals $E_1$ to $E_M$, respectively, by the factor M (the same as the downsampling rate in the analysis filter 60). The outputs of the upsamplers $65_1$ to $65_M$ are supplied to a corresponding plurality of bandpass filters $66_1$ to $66_M$, respectively. The outputs of the filters $66_1$ to $66_M$ are summed by summing device 67 for output to the adaptive filter 52 (FIG. 3). It should be noted that the filters $66_1$ to $66_M$ in the synthesis filter bank 64 are not identical to the corresponding filters $66_1$ to $61_M$ in the analysis filter bank 60. The relationship between the analysis filter bank 60 and the synthesis filter bank 64, and especially the coefficients of their filters, is known to those skilled in this art and so will not be described in detail here. For details, the reader is directed to chapter 7 entitled "Multirate Signal Processing" of the text book "Advanced Digital Signal Processing: Theory and Applications", by G. Zelniker and F. Taylor, publ. Marcel Dekker, Inc., and to the technical literature, including the articles by Akansu et al and by Crosier et al (supra).

Figure 4:
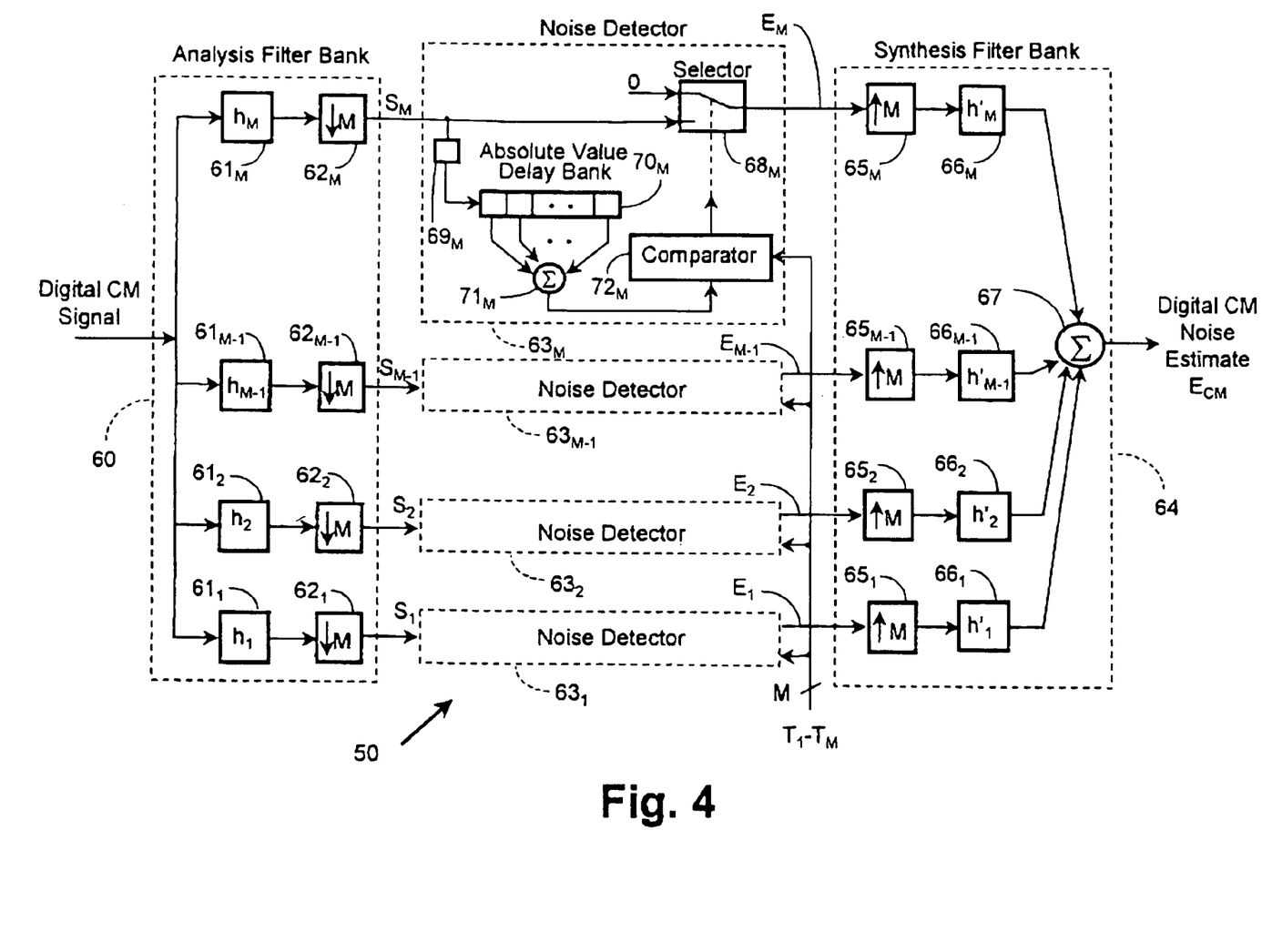
FIG. 4 illustrates a suitable noise detector for the embodiment of FIG. 3.

The noise detection circuits $63_1$ to $63_M$ have identical structures so only one circuit $63_M$, is shown in detail in FIG. 4, for simplicity.

The components of the noise detection circuit $63_M$ are controlled by a common clock which, for convenience of illustration, is not shown. Within the noise detection circuit $63_M$, each sample value of the subband signal $S_M$ is applied to one input of a selector $68_M$, which may be a multiplexer, and to an absolute value device $69_M$ which strips off the sign and supplies the sample value to an input of a delay bank $70_M$. The outputs of the delay bank $70_M$ are supplied in parallel to a summing device $71_M$, which sums them and supplies the sum to a comparator $72_M$. The selector $68_M$ is controlled by the output of the comparator $72_M$ to select either the instant sample of the subband signal or a zero value and supply it to the corresponding input of the synthesis filter bank 64. The subband signal $S_M$ is clocked through the delay bank $70_M$ continuously. The values in the delay bank $70_M$ in any clock cycle are summed by the summing device $71_M$ and the summation value compared with a threshold value $T_M$. If the summation value is greater than the threshold value $T_M$, the output of comparator $72_M$ is a "1" causing selector $68_M$ to select the instant sample value of the subband signal $S_M$, and supply it as the digital noise estimate signal $E_M$ for channel M to the corresponding input of synthesis filter bank 64. If the summation value is less than the threshold T, the comparator $72_M$ supplies a zero to selector $68_{M\ 9}$ causing it to provide a zero value as the digital noise estimate signal $E_M$. Thus, when the subband signal $S_M$ contains a certain common mode noise component, the instant sample value of subband signal $S_M$ is supplied as the digital noise estimate signal $E_M$. Otherwise, no value is supplied.

The other noise detection and phase inversion circuits $63_1$ to $63_{M-1}$ produce corresponding digital noise estimate signals $E_1$ to $E_{M-1}$ in a similar manner.

The phase inversion units $63_1$ to $63_M$ use threshold values $T_1$ to $T_M$, respectively, which are adjusted individually by the control unit 54 (FIG. 3).

Generally, each threshold value will be selected according to the nature of the noise in the corresponding subband frequency band. In general, impulse noise will tend to be rather large in amplitude compared to radio frequency interference but of shorter duration. Consequently, each threshold value $T_1$ to $T_M$ may be selected so that the threshold value will be exceeded if a small number of segments of the corresponding one of the delay banks $70_1$ to $70_M$ contain relatively high values; or all of the segments of the delay bank contain somewhat lower values, as would occur with a radio frequency interference signal. Hence, the length of the delay banks $70_1$ to $70_M$, any scaling factors of the signal supplied to the analysis filter bank, and the threshold would be arranged or could be adjusted to suit particular conditions prevailing in the vicinity of the installation.

It should be appreciated that, although the specific embodiment uses a uniformly, maximally decimated analysis filter bank, other structures are feasible. For example, the analysis filter bank could provide a plurality of subband signals concentrated at the higher frequencies where radio frequency or impulse noise might be a greater problem due to the relatively lower energy of the transmitted signal.

For further information about the digital noise detector, and examples of the various possible configurations for the digital noise detector 50, the reader is directed to the aforementioned Canadian patent application No. 2,239,675.

It should be noted that the digital noise detector 50 provides a history of the common mode signal over several samples. It has been proposed, however, in the context of high speed digital subscriber loops, to detect noise in the received signal by comparing the power spectral density of each block of the received signal with a predefined desired spectral mask for the received (information) signal. If that is done, the digital noise detector 50 illustrated in FIG. 4 could be modified by omitting, in the noise detectors $63_1$ to $63_M$, the absolute value devices $69_1$ to $69_M$, the delay banks $70_1$ to $70_M$, the summing devices $71_1$ to $71_M$ and the comparators $72_1$ to $72_M$. The subband signals $S_1$ to $S_M$ then are applied directly to the selectors $68_1$ to $68_M$, respectively. The microcontroller 54 will then supply control signals $T_1$ to $T_M$ directly to the selectors $68_1$ to $68_M$, respectively. It should be appreciated that the signals $T_1$ to $T_M$ will not be threshold signals but rather 1 bit control signals to toggle the selectors.

It is also envisaged that the downsamplers $62_1$ to $62_M$ in the analysis filter bank 60 and the upsamplers $65_1$ to $65_M$ in the synthesis filter bank 64 might be omitted. As mentioned earlier, the passbands of the filters $61_1$ to $61_M$ and filters $66_1$ to $66_M$ must have the required degree of overlap.

Figure 5:
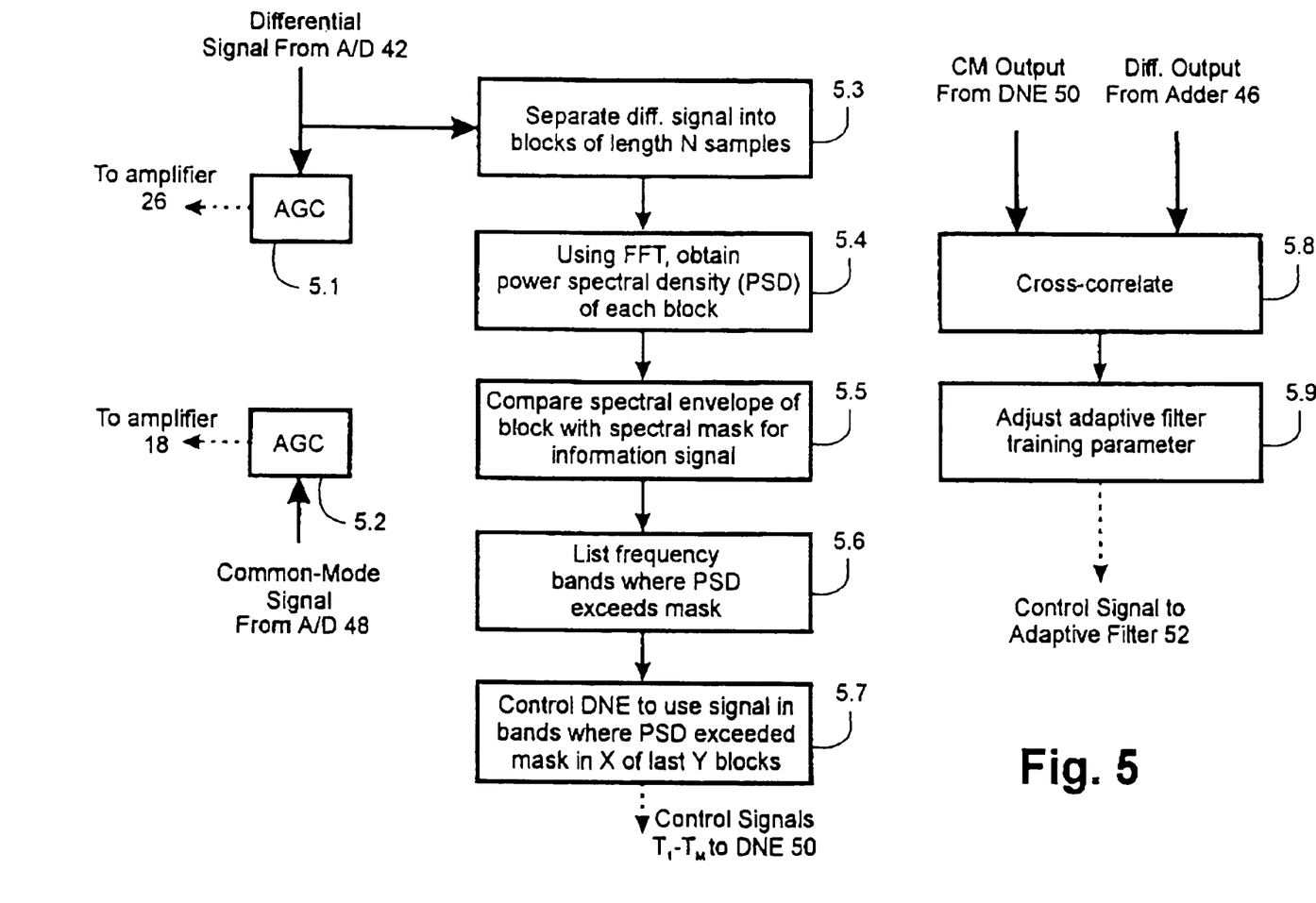
FIG. 5 illustrates functions of a control unit of the embodiment of FIG. 3.

When such a modified digital noise detector is used, the control unit 54 will compare the spectral power density of the received signal with a prescribed power spectral density mask or template to detect those bands in which significant noise occurs. Referring now to FIG. 5, in step 5.3 the microcontroller 54 partitions the received differential signal from A/D converter 42 into blocks each of length N samples, for example 240 samples. In step 5.4, the microcontroller uses Fast Fourier Transform (FFT) to obtain the power spectral density of each block and, in step 5.5, compares the resulting spectral envelope with a spectral mask previously stored in the microcontroller's memory (not shown). It is expected that the parameters of the spectral mask will be set by national or international standards on the basis of experiments conducted with various kinds of communications channels or loops.

In step 5.6, the microcontroller lists the frequency bands in which the power spectral density of the block exceeds the envelope of the spectral mask and stores the information. In step 5.7, determines for each band whether or not the power spectral density exceeded the envelope in a predetermined number X of a predetermined previous number Y of the blocks. If it did, the microcontroller adjusts the corresponding one of the signals $T_1$ to $T_M$ to select that band so that the digital noise detector 50 will sum the common mode noise signal in each of those bands to produce the common mode noise signal for application to the adaptive filter 52.

It is important that the digital noise detector not introduce any extra noise that might be correlated in some way with the information signal. Similarly, the DND cannot afford to make frequent changes to its output, as such activity could prevent the adaptive filter from converging properly. This can be assured by providing a suitable length of delay banks $70_1$ to $70_M$, where the DND of FIG. 4 is used, and/or by ensuring that the number of blocks X in step 5.7 is sufficient.

FIG. 5 also illustrates the cross-correlation function of the microcontroller 54, which will be performed whether the digital noise detector 50 is as shown in FIG. 4 or modified as described hereinbefore. Thus, step 5.8 determines cross-correlation between the common mode signal from digital noise detector 50 and the system output from adder 46 and step 5.9 adjusts the coefficients of the adaptive filter 52 to reduce any such correlation, ideally to zero.

Figure 6:
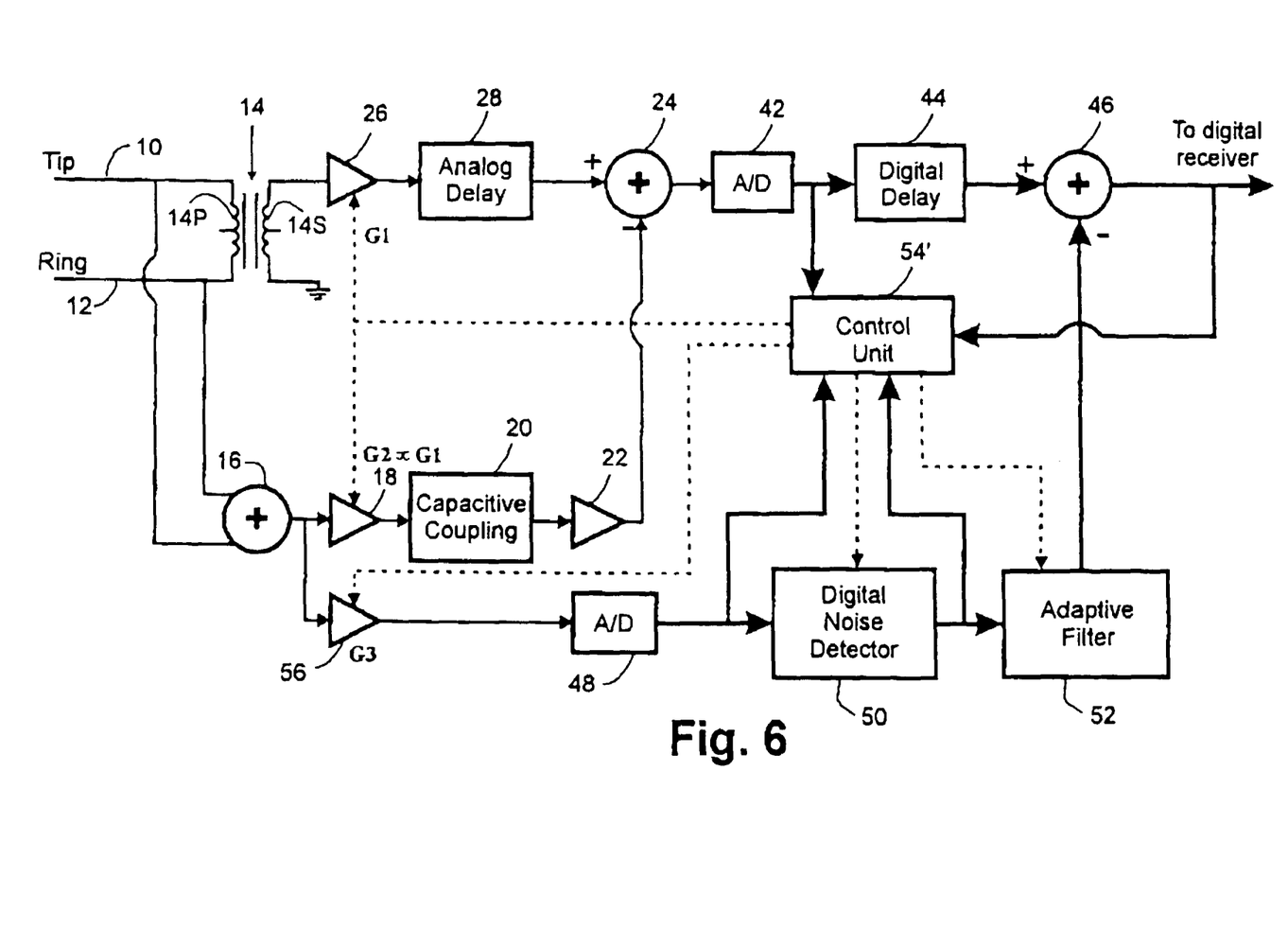
FIG. 6 illustrates a third embodiment of the invention which combines the embodiments of FIGS. 1 and 3.

FIG. 6 illustrates a third embodiment of the invention which employs both the stray capacitive coupling compensation of the embodiment of FIG. 1 and the adaptive filter compensation approach of the embodiment of FIG. 3. As in both of the first and second embodiments, the TIP conductor 10 and RING conductor 12 are connected to the primary winding 14P of the hybrid transformer 14, the secondary winding 14S having one end grounded and the other end connected to the differential signal path, i.e. to variable gain amplifier 26. It should be noted, however, that the differential path of the circuit illustrated in FIG. 6 comprises an analog portion formed by analog delay device 28 and analog summer 24 and a digital portion formed by an A/D converter 42, a digital delay 44 and a digital adder 46, the output of the latter being the output of the noise cancellation circuit and applied to the usual receiver.

The circuit has both an analog common mode path similar to that shown in FIG. 1 and a digital common mode path similar to that shown in FIG. 3. The summer 16 is shared by both paths. As in the embodiment of FIG. 1, the analog common mode path comprises a variable gain amplifier 18, which has a gain G2 proportional to the gain G1 of variable amplifier 26, a capacitive coupling device 20 and an inverting amplifier 22, the output of which is connected to the second input of summer 24, as before. In this circuit, however, the output of analog summer 24 is digitized by A/D converter 42 and supplied to digital delay 44 which supplies the delayed differential signal to a first input of digital adder 46. The output of summer 16 is also supplied to an input of a third variable gain amplifier 56 which has a gain G3. The output of the amplifier 56 is digitized by second A/D converter 48 and supplied to the digital noise detector 50 and the control unit 54' which detects the noisy bands and passes only the signals in those bands to the adaptive filter 52. As in the embodiment of FIG. 3, the control unit/microcontroller 54 receives inputs also from the respective outputs of A/D converter 42, digital adder 46, and digital noise detector 50.

The control unit 54' will differ from the control unit 54 of FIG. 3 because it will control the gains G1, G2 and G3 of the three amplifiers 26, 18 and 56, respectively. Its control of the adaptive filter 52 will be as described with reference to FIGS. 3 and 4 or FIGS. 3 and 5, i.e. using threshold control signals or selector control signals, depending upon the nature of digital noise detector 50. As before, if the DND 50 shown in FIG. 6 is that shown in FIG. 4, which performs historical analysis of the received signal, the microcontroller 54 need not conduct spectral analysis. If the DND 50 does not perform historical analysis, the microcontroller 54 will perform the spectral analysis and comparison described with respect to FIG. 5.

The invention embraces various other modification and improvements to the above-described embodiments. Thus, control unit 54 could extract differential and common mode signals from other points in the differential signal path and common mode signal path, respectively.

It should be appreciated that the various aspects of the invention are not necessarily limited to noise cancellation in twisted pair subscriber loops but could be applied to other communications channels, in which case the input means might not be a hybrid transformer. For example, the embodiment of FIG. 3 could be used with communications channels which employ coaxial cables, comprising a coaxial shield and one or more inner conductors. In such a case, the hybrid transformer shown in FIG. 3 would be omitted and the coaxial shield connected directly to the input of amplifier 18. Where a single inner conductor was used, it would be connected directly to the input of amplifier 26. If two or more inner conductors were used, they would be interfaced to the noise detection circuit by way of a suitable matching transformer.

It should be appreciated that, although the above-described embodiment of the invention use analog components to provide the compensation for the capacitive coupling, the compensation could be implemented digitally, perhaps using a digital signal processor.

INDUSTRIAL APPLICABILITY

Embodiments of the invention advantageously provide noise cancellation for communications channels, such as telephone subscriber loops, which compensates for the effects of stray capacitive coupling in the hybrid and/or impedance imbalance effects in the communications channel yet do not require a quiet period for training purposes.

What is claimed is:

1. A noise cancellation circuit for a communications channel comprising a differential signal path and a common mode signal path connected to respective inputs of a summing device, the differential signal path comprising input means connected to the channel for receiving a differential signal therefrom and supplying the differential signal to a first of the inputs of the summing device, the common mode signal path comprising extraction means coupled to the channel for extracting therefrom a common mode signal, and coupling means for coupling at least part of the extracted common mode signal to a second of the inputs of the summing device as a common mode noise signal, the coupling means comprising a circuit element having a fixed capacitance equivalent to stray capacitance coupling between an input and an output, respectively, of the input means, the circuit further comprising delay means for compensating for phase differences between the differential signal and common mode noise signal before their application to the summing device, the summing device providing as an output signal of the noise cancellation circuit the difference between the differential signal and the common mode noise estimate signal.

2. A noise cancellation circuit according to claim 1, wherein the first compensating means comprises an analog delay unit interposed between the input means and the summing device and having a delay period substantially equal to delay introduced in to analog common mode signal path.

3. A noise cancellation circuit for a communications channel comprising a differential signal path and a common mode signal path connected to respective inputs of a digital adder, the differential signal path comprising input means connected to the channel for receiving a differential signal therefrom and analog-to-digital converter means coupled to the input means for digitizing the received differential signal and applying the digitized differential signal to a first of the inputs of the digital adder, the common mode signal path comprising extraction means coupled to the channel for extracting therefrom a common mode signal a second analog-to-digital converter means coupled to the extraction means for digitizing the extracted common mode signal and applying the digitized extracted common mode signal to a noise detector for detecting frequency bands of the common mode signal wherein noise exceeds a predetermined level and passing only those portions of the digitized common mode signal in the detected frequency bands to an adaptive filter, the adaptive filter filtering the portions of the digitized common mode signal to produce a digital common mode noise estimate signal and applying the digital estimate signal to the second input of the digital adder, control means having inputs connected to the differential signal path and the common mode signal path and for determining correlation between signals in the differential signal path and common mode signal path and adjusting coefficients of the adaptive filter in dependence thereupon so as to reduce correlation between the differential and common mode signals, the circuit further comprising means for compensating for phase differences between the differential signal and the common mode signal before their application to the digital adder, the adder providing as an output signal of the noise cancellation circuit the difference between the differential signal and the digital common mode noise estimate signal.

4. A noise cancellation circuit for a communications channel comprising a differential signal path and a common mode signal path connected to respective inputs of a summing device, the differential signal path comprising input means connected to the channel for receiving a differential signal therefrom and supplying the differential signal to a first of the inputs of the summing device, the common mode signal path comprising extraction means coupled to the channel for extracting therefrom a common mode signal, and coupling means for coupling at least part of the extracted common mode signal to a second of the inputs of the summing device as a common mode noise estimate signal, the coupling means having a capacitive component equivalent to stray capacitance coupling between an input and an output, respectively, of the input means, the circuit further comprising means for compensating for phase differences between the differential signal and common mode noise estimate signal before their application to the summing device, the summing device providing as an output signal of the noise cancellation circuit the difference between the differential signal and the common mode noise estimate signal, wherein the input means comprises a hybrid transformer and the coupling means comprises a second hybrid transformer similar to the first hybrid transformer, the primary winding of the second hybrid transformer being short-circuited and connected to the output of the common mode signal extraction means for reception of the common mode signal and the secondary winding of the second transformer being connected to said second input of the summing device.

5. A noise cancellation circuit for a communications channel comprises a differential signal path and a first common mode signal path connected to respective inputs of a summing device, the differential signal path comprising input means connected to the channel for receiving a differential signal therefrom and supplying same to a first of the inputs of the summing device, the first common mode signal path comprising extraction means coupled to the channel for extracting therefrom a common mode signal and coupling means connected between the common mode extraction means and a second input of the summing means for coupling an analog common mode noise estimate signal to the summing means, the coupling means having a capacitive component equivalent to stray capacitance coupling between the input and the output, respectively, of the input means, and first compensating means for compensating for phase differences between the differential signal and analog common mode noise estimate signal before their application to the summing device, the output of the summing device being connected by way of an analog-to-digital converter to a first input of a digital adder means, the circuit further comprising a second common mode signal path connected between the common mode signal extraction means and a second input of the digital adder, the second common mode signal path comprising a noise detector connected by way of an analog-to-digital converter to the output of the common mode extraction means, the noise detector being operable to detect one or more noisy frequency bands of a digitized common mode signal from the analog-to-digital converter means and pass the digitized common mode signal in those detected frequency bands to an adaptive filter, the output of the adaptive filter comprising a digital common mode noise estimate signal and being applied to a second input of the digital adder means, the circuit comprising control means connected to the differential signal path and the digital common mode signal path for determining correlation between signals in the differential signal path and digital common mode signal path, respectively, and adjusting coefficients of the adaptive filter in dependence thereupon so as to reduce correlation between said signals, the circuit further comprising second compensating means for compensating for phase differences between the signal output from the first summing means and the digital common mode noise estimate signal before their application to the respective inputs of the digital adder means, the digital adder means providing as an output signal of the noise cancellation circuit the difference between the differential signal and the two common mode noise estimate signals, wherein the input means comprises a hybrid transformer and the coupling means comprises a second hybrid transformer similar to the first hybrid transformer, the primary winding of the second hybrid transformer being short-circuited and connected to the output of the common mode signal extraction means for reception of the common mode signal and the secondary winding of the second transformer being connected to said second input of the summing device.

6. A method of cancelling common mode noise in signals received from a communications channel using a noise cancellation circuit having input means connected to the channel, comprising the steps of:
   extracting via the input means from the channel a differential signal;
   extracting from the channel a common mode signal;
   passing at least part of the extracted common mode signal, as a common mode noise signal, through a coupling device comprising a circuit element having a fixed capacitance equivalent to stray capacitance coupling between an input and an output, respectively, of the input means,
   compensating for phase differences between the differential signal and common mode noise signal and obtaining the difference between the differential signal and the common mode noise signal.

7. A noise cancellation method according to claim 6, wherein the compensation is provided by delaying the differential signal by a delay period substantially equal to delay incurred by the analog common mode signal during extraction and noise detection.

8. A method of cancelling common mode noise in signals received from a communications channel using a noise cancellation circuit having input means connected to the channel, the method comprising the steps of:
   extracting from the channel via the input means a differential signal and a common mode signal and digitizing same;
   using a digital noise detector, detecting in the digitized extracted common mode signal frequency bands of the common mode signal wherein noise exceeds a predetermined level;
   passing only those portions of the digitized common mode signal in the detected frequency bands through an adaptive filter to produce a digital common mode noise estimate signal;
   determining correlation between the differential signal and common mode signal and adjusting coefficients of the adaptive filter in dependence thereupon so as to reduce correlation between the differential and common mode signals,
   compensating for phase differences between the differential signal and the digital common mode noise estimate signal before combining the digitized differential signal and the digital noise estimate signal subtractively to provide an output signal.

9. A method of cancelling common mode noise in signals received from a communications channel using a noise cancellation circuit having input means connected to the channel, comprising the steps of:
   extracting via the input means from the channel a differential signal;
   extracting from the channel a common mode signal;
   passing at least part of the extracted common mode signal through a coupling device having a capacitive component equivalent to stray capacitance coupling between an input and an output respectively, of the input means,
   compensating for phase differences between the differential signal and common mode noise estimate signal and obtaining the difference between the differential signal and the common mode noise estimate signal, wherein the input means comprises a hybrid transformer and the coupling is achieved using a second hybrid transformer similar to the first hybrid transformer, the primary winding of the second hybrid transformer being short-circuited and connected for reception of the common mode signal and the secondary winding of the second transformer providing the common mode signal.

10. A method of cancelling noise in signals received from a communications channel using a noise cancellation circuit having input means connected to the channel, the method comprising the steps of:
   extracting via the input means from the channel a differential signal;
   extracting from the channel a common mode signal;
   passing at least part of the extracted common mode signal through a coupling device having a capacitive component equivalent to stray capacitance coupling between an input and an output, respectively, of the input means,
   compensating for phase differences between the differential signal and common mode noise estimate signal and obtaining the difference between the differential signal and the common mode noise estimate signal; and
   extracting from the channel via the input means a differential signal and a common mode signal and digitizing same;
   using a digital noise detector, detecting in the digitized extracted common mode signal one or more noisy frequency bands of the common mode signal;
   passing the digitized common mode signal in those detected frequency bands through an adaptive filter to produce a digital common mode noise estimate signal;
   determining correlation between the differential signal and common mode signal and adjusting coefficients of the adaptive filter in dependence thereupon so as to reduce correlation between the differential and common mode signals,
   compensating for phase differences between the differential signal and the digital common mode noise estimate signal before combining the digitized differential signal and the digital noise estimate signal subtractively to provide an output signal, wherein the input means comprises a hybrid transformer and the coupling is achieved using a second hybrid transformer similar to the first hybrid transformer, the primary winding of the second hybrid transformer being short-circuited and connected for reception of the common mode signal and the secondary winding of the second transformer providing the common mode signal.

11. A noise cancellation circuit for a communications channel comprising:
   (i) input means coupled to the channel for extracting a differential signal therefrom;
   (ii) common mode signal extraction means coupled to the channel for extracting therefrom a common mode signal;
   (iii) a differential signal path having an analog portion coupled between the input means and a first input of an analog summing device and a digital portion coupled between an output of the analog summing device and a first input of a digital adding means;
   (iv) an analog common mode signal path; and
   (v) a digital common mode signal path;
wherein the analog common mode signal path comprises
   (vi) analog coupling means connected between the common mode extraction means and a second input of the analog summing means, the coupling means comprising a circuit component having a capacitance equivalent to stray capacitance coupling between the input and the output, respectively, of the input means, for coupling an analog common mode noise estimate signal to the first summing means;

the analog differential signal path portion comprises
- (vii) first compensating means for compensating for phase differences between the differential signal and analog common mode noise estimate signal before their application to the analog summing device, the analog summing device subtracting the analog common mode noise estimate signal from the analog differential signal to produce a partially noise-reduced differential mode signal;

the digital common mode signal path comprising
- (viii) a second analog-to-digital converter coupled to the common mode signal extraction means for converting the common mode signal to a digital common mode signal;
- (ix) a digital noise detector coupled to the second analog-to-digital converter for detecting noise in the common mode signal and selecting for output only those portions of the digital common mode signal having a predetermined level of noise,
- (x) an adaptive filter coupled to the digital noise detector for filtering the selected portions of the digital common mode signal to produce a digital common mode estimate signal and applying the digital common mode estimate signal to a second input of the digital adder, the digital differential path portion comprises
- (xi) an analog-to-digital converter coupled to said output of the analog summing device for converting the partially noise-reduced differential mode signal into a digital differential mode signal,
- (xii) second compensating means for compensating for phase differences between the signal output from the first summing means and the digital common mode noise estimate signal before their application to the respective inputs of the digital adder means, and
- (xiii) control means connected to the differential signal path and the digital common mode signal path for determining correlation between signals in the differential signal path and digital common mode signal path, respectively, and adjusting coefficients of the adaptive filter in dependence thereupon so as to reduce correlation between said signals, the digital adder means providing as an output signal of the noise cancellation circuit the difference between the differential signal and the two common mode noise estimate signals.

12. A noise cancellation circuit according to claim 11, wherein the first compensating means comprises an analog delay unit interposed between the input means and the analog summing device and having a delay period substantially equal to delay introduced in the analog common mode signal path.

13. A method of cancelling common mode noise in signals received from a communications channel using a noise cancellation circuit having input means connected to the channel, comprising the steps of:
- (i) extracting a differential signal from the channel via the input means;
- (ii) extracting a common mode signal from the channel;
- (iii) passing at least part of the common mode signal through a coupling device comprising a circuit component having a capacitance equivalent to stray capacitance coupling between the input and the output, respectively, of the input means, to provide an analog common mode noise estimate signal;
- (iv) summing the differential signal and the analog common mode estimate signal subtractively to produce a partially noise-reduced differential mode signal;
- (v) compensating for phase differences between the differential signal and analog common mode noise estimate signal before summing same;
- (vi) converting the common mode signal to a digital common mode signal;
- (vii) detecting noise in the digital common mode signal and selecting for output only those portions of the digital common mode signal having a predetermined level of noise,
- (viii) using an adaptive filter, filtering the selected portions of the digital common mode signal to produce a digital common mode estimate signal;
- (ix) converting the partially noise-reduced differential mode signal into a digital differential mode signal,
- (x) subtracting the digital common mode estimate signal from the digital common mode signal;
- (xi) compensating for phase differences between the signal output from the first summing means and the digital common mode noise estimate signal before subtracting same,
- (xii) determining correlation between the digital differential signal and the digital common mode signal and adjusting coefficients of the adaptive filter in dependence thereupon so as to reduce correlation between said signals, the noise cancelled signal being the difference between the differential signal and the two common mode noise estimate signals.

14. A noise cancellation method according to claim 13, wherein the compensation is provided by delaying the differential signal by a delay period substantially equal to delay incurred by the analog common mode signal during extraction and noise detection.

* * * * *